H. Pattison,
Animal Trap.
No. 91,363. Patented June 15, 1869.

United States Patent Office.

HENRY PATTISON, OF DUCK CREEK, ILLINOIS.

*Letters Patent No. 91,363, dated June 15, 1869.*

IMPROVED ANIMAL-TRAP.

The Schedule referred to in these Letters Patent and making part of the same.

*To all whom it may concern:*

Be it known that I, HENRY PATTISON, of Duck Creek, in the county of Warren, and State of Illinois, have invented a new and improved Animal-Trap; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved animal-trap, simple in construction and effective in operation, catching and caging the animals in such a way as not to alarm the other animals still uncaught, and which shall also be self-setting; and It consists in the construction and combination of various parts of the trap, as hereinafter more fully described.

Figure 1:
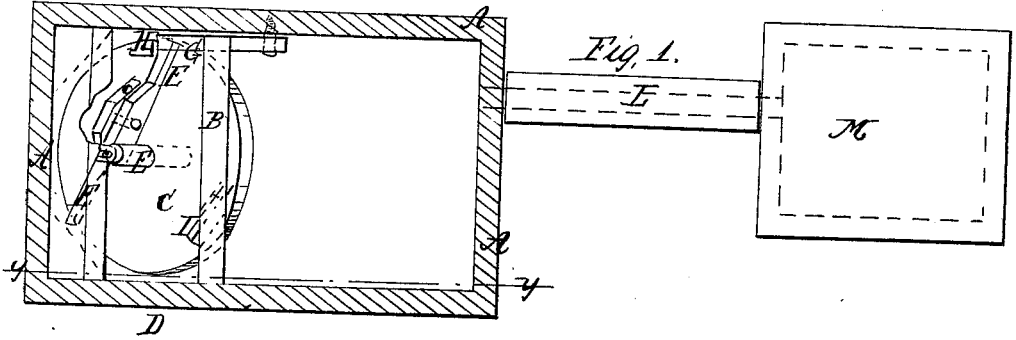
Figure 1 is a top view of my improved trap, partly in section, through the line x–x, fig. 2.
Figure 2:
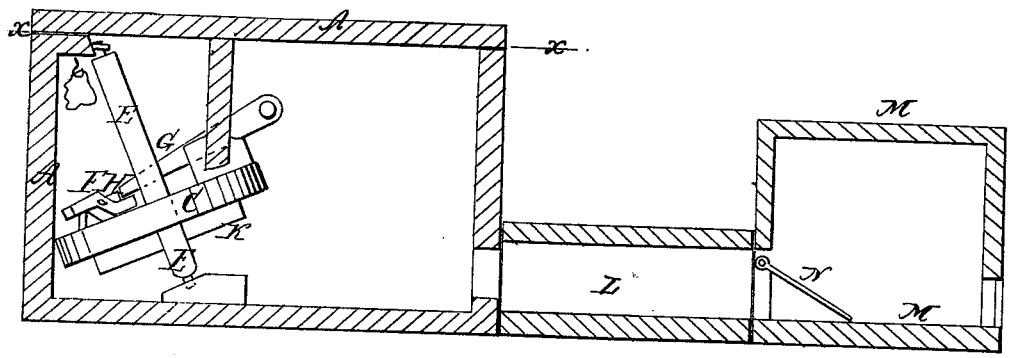
Figure 2 is a detail vertical section of the same, taken through the line y–y, fig. 1.

A represents the trap, which is divided into two compartments, by the partition B and inclined wheel C, as shown in figs. 1 and 2.

The wheel C is attached to the shaft E, pivoted, in an inclined position, to the upper and lower parts of the trap, so as to give such an inclination to the said wheel C that the weight of the animal caught will revolve it.

F is a lever, pivoted to the wheel C in such a position that its raised lighter end may be directly under the suspended bait, so that the animal, in trying to reach the bait, may step upon it, and thus raise its other or heavier end.

G is a trigger, one end of which is pivoted to the side of the trap A, and its other end crosses the heavier end of the lever F, and rests against the stop H attached to the wheel C, so as to hold the wheel stationary until released by the animal stepping upon the raised end of the lever F.

As the wheel is revolved by the weight of the animal, the wing, or flange I, attached to the edge of the wheel C, moves forward from its position, closing the opening, or passage in the partition B, uncovering the said hole, or opening, and covering the hole D, in the side of the trap A, through which the animal enters.

As the wheel C begins to move, the animal, being alarmed, seeks to escape, and rushes through the opening in the partition B into the other compartment of the trap.

As soon as the wheel C is released from the weight of the animal, it is again revolved back to its former position by the weight K, attached to the under side, again setting the trap.

The only opening the animal can find in the compartment of the trap in which he now is, is that which leads into the passage L, the other end of which opens into the cage M.

The opening leading into the cage M is closed by a drop-gate, N, constructed and arranged, as shown in fig. 2, in such a way that it may be easily opened by the animal passing into the said trap, but cannot be opened by him to pass out.

The passage L should be of such a length as to remove any suspicion on the part of the uncaught animals that there can be any connection between the said cage and the trap A.

The cage M should be provided with an aperture, protected with a grating, through which the uncaught animals can see their imprisoned fellow, and thus, while seeking to avoid the harmless cage, may enter, without suspicion, the fatal trap.

The suspicion of the animals, with reference to the trap A, should be still further lulled, by making the entrance-hole D, of said trap A, of such a form as the animal, taught by instinct, would know for himself.

Having thus described my invention,

What I claim as new, and desire to secure by Letters Patent, is—

The combination of the weighted wheel C, lever F, trigger G, stop H, wing, or flange I, and partition B, with each other, and with the trap A and entrance D, substantially as herein shown and described, and for the purpose set forth.

HENRY PATTISON.

Witnesses:
J. R. PORTER,
J. C. ROBB.